United States Patent Office 3,427,366
Patented Feb. 11, 1969

3,427,366
HYDROCARBON RUBBER AND POLYURETHANE PREPARED FROM A POLYISOCYANATE AND AN HYDROXY TERMINATED DIENE POLYMER
Joseph A. Verdol, Dolton, and Patrick W. Ryan, Chicago Heights, Ill., assignors to Sinclair Research, Inc., New York, N.Y., a corporation of Delaware
No Drawing. Continuation of application Ser. No. 536,292, Mar. 22, 1966. This application Mar. 15, 1968, Ser. No. 713,543
U.S. Cl. 260—859                23 Claims
Int. Cl. C08f 45/72, 27/10

ABSTRACT OF THE DISCLOSURE

Rubber compositions containing hydrocarbon rubber and urethane resin which is the reaction product of a diisocyanate with an intermediate polyhydroxy polymer having an average of at least about 1.8 predominantly primary, terminal, allylic hydroxyl groups per average molecule and being an addition polymer of 0–75% by weight of an alpha-olefin monomer of 2 to 12 carbon atoms, and about 25 to 100% of a 1,3-diene hydrocarbon of 4 to about 12 carbon atoms, the intermediate polyhydroxy polymer having a viscosity at 30° C. of about 5–20,000 poises and a number average molecular weight of about 400–25,000. The urethane component is at least partially uncured when combined with the hydrocarbon rubber. These rubber compositions have improved tack and handling characteristics, improved resistance to attack by hydrocarbon oils and solvents as well as increased abrasion resistance and other desirable features, such as high tensile strength.

---

This invention is a continuation-in-part of copending application Ser. No. 465,161, filed June 18, 1965.

This application is a continuation of Ser. No. 536,292, filed Mar. 22, 1966, now abandoned.

The present invention is concerned with novel rubbers which have improved tack and handling characteristics. The compositions contain conventional hydrocarbon-type rubber and urethane rubber derived from particular hydroxy intermediate polymers. In accordance with the present invention, urethane elastomers derived from polydiene intermediate polymers having predominantly primary, terminal, allylic hydroxyl groups are combined with general purpose hydrocarbon-type elastomers such as natural rubber, styrenebutadiene rubber, cis-polybutadiene rubber, ethylenepropylene terpolymer rubber, butyl rubber and various other conventional elastomers. The combinations of these rubbers with urethane, according to this invention, show improved resistance to attack by hydrocarbon oils and solvents as well as increased abrasion resistance and other desirable features, such as high tensile strength.

It has been found that general purpose elastomers, especially ethylene-propylene rubbers, show increased "tack" when modified with urethane elastomers according to this invention. This is of important commercial significance, since one of the major shortcomings of commercially available ethylene-propylene terpolymer rubbers is their inherent lack of tack. Tack is a property of rubber which enables two fresh rubber surfaces to adhere or coalesce. For example, although the surfaces of rubbers may not appear tacky or adhere to foreign surfaces, the rubber surfaces adhere well to each other if the rubber possesses sufficient tack. Tack is very important from the practical standpoint, e.g., for producing rubber goods such as tires and other rubber articles. During the fabrication of rubber goods the surfaces should readily stick together so they may be rolled into place or molded. For example, plies and tread splices must hold during fabrication. It is also desirable for rubber stocks to adhere well during milling on a rubber mill.

Urethane elastomers are known to have vastly different properties which distinguish them from the so-called "general purpose" or essentially hydrocarbon rubbers. Perhaps the most outstanding characteristics of urethane rubbers are their excellent abrasion resistance, high tensile strengths, and resistance to attack by hydrocarbon oils and organic solvents. However, urethane polymers known to the art generally are considered incompatible for blending with the conventional rubbers, which have a backbone structure composed largely of saturated or unsaturated hydrocarbon groups. The urethane resin which forms part of the composition of this invention is derived by isocyanate reaction with a diene intermediate polymer having a particular structure and containing allylic hydroxyl groups, which usually are at the ends of the main, that is, the longest, hydrocarbon chain of these usually liquid diene polymers. The intermediate polymers may, in general, have a viscosity at 30° C., of about 5–20,000 poises, preferably about 15 to 5000 poises. Ofter the intermediate polymer is obtained in a viscosity range of about 20 to 300 or 500 poises at 30° C. Preferably, the diene homopolymers have a viscosity of about 35 to 60 poises or about 190 to 260 poises. Thus, the diene polymers are liquids or semi-solids flowable, at least when subjected to moderate pressure, at ambient temperatures or at temperatures up to about 400° F. The allylic hydroxyl-terminated intermediate polymers used in the present invention will have molecular weights in the range of about 400 to about 25,000 as determined by cryoscopic, ebullioscopic or osmometric methods. The preferred hydroxyl-containing diene polymers will be in the molecular weight range of about 900 to 10,000. In contrast, conventional diene polymers such as GR–S rubber are extremely high in molecular weight, e.g., in the range of several hundred thousand.

The hydroxy-terminated diene intermediate polymers employed to make the novel compositions of this invention differ from conventional diene polymers known to be telechelic and/or hydroxy-containing in that the hydroxy components of the diene polymers used in this invention are in predominantly primary, terminal positions on the main hydrocarbon chain and allylic in configuration. Ordinarily, at least about 1.8 hydroxyl groups are present per molecule on the average and advantageously, there are at least 2.1 to say 3 or more hydroxyls per intermediate polymer molecule, preferably 2.1 to 2.8. As mentioned, the hydroxyl groups are predominantly allylic in structure, thereby being of a more reactive nature in the urethane-forming reaction and apparently providing an improved stability in the final elastomer product. The diene partial polymer has the majority of its unsaturation in the main hydrocarbon chain and this appears to provide polymers of improved elasticity characteristics.

The dienes which are employed to make the intermediate polymers are unsubstituted, 2-substituted or 2,3-disubstituted 1,3-dienes of up to about 12 carbon atoms. The diene preferably has up to 6 carbon atoms and the substituents in the 2- and/or 3-position may be hydrogen, alkyl, generally lower alkyl, e.g. of 1–4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, etc. The choice of diene will usually depend upon properties desired in the final elastomer, for example, chloroprene may be used, alone or in admixture with other dienes to produce oil-resistant and flame-proof rubbers. By "allylic" configuration is meant the alpha-allylic grouping of allylic alcohol, that is, the terminal hydroxyls of the first intermediate polymer are attached to a carbon adjacent to a double-bond carbon.

The number and location of the hydroxyl groups and the molecular weight of the intermediate polymer can be a function of polymerization temperature and the type of addition polymerization system employed in forming the polymer. It has been found that diene polymers of the desired configuration may be obtained using hydrogen peroxide as the catalyst for polymerization. This free-radical addition polymerization usually takes place at a temperature of about 100–200° C., preferably about 100–150° C.

The reaction preferably takes place in a mutual solvent system; that is, one which dissolves both the diene monomer and the hydrogen peroxide. Suitable solvents are isopropanol, acetone, methanol, sec-butanol, n-butanol, n-propanol and like alcohols having 2 to about 12 carbon atoms. The $H_2O_2$-solvent system is found to supply hydroxyl groups and the catalytic and solvent effects needed to produce the intermediate diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymers. The alcohol will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1% to 15% of the reaction mixture to assure a low molecular weight addition polymer product having more than two hydroxyl groups per molecule.

The usable intermediate polymers of butadiene will preferably conform to the following simplified chemical structure:

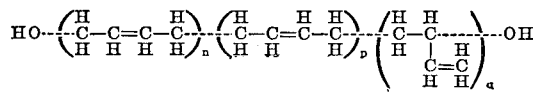

in which $n$ plus $p$ is greater than $q$, that is, the in-chain unsaturation accounts for more than 50% of the unsaturation. One or more of the hydrogens appearing in the above formula may be replaced by hydroxyl in some of the molecules. This formula should not be understood as implying that the polymers are necessarily in blocks, but the cis-1,4-, trans-1,4- and vinyl (1,2) unsaturation are usually distributed throughout the polymer molecule. The letter $n$ may represent a number sufficient to give a cis-1,4-unsaturation content of about 10–30 percent; $p$ may be a number sufficient to give a trans-1,4-unsaturation content to the polymer in the range of about 40–70 percent while $q$ may be sufficient to give a pendant 1,2-vinyl unsaturation of about 10–35 percent. Often the polymer will contain largely trans-1,4-units, e.g., about 50–65 percent and about 15–25 percent cis-1,4-units, with about 15–25 percent 1,2-units. Branching may also occur in the above polymers, especially those prepared at higher temperatures.

Olefinically unsaturated monomers may be incorporated into the diene intermediate polymer products used in this invention and these may often be components which provide cross-linking sites. Usable monomers include alpha-mono olefinic materials of about 2 or 3 to 10 or 12 carbon atoms such as styrene, vinyl toluene, methyl methacrylate, methylacrylate, acrylic esters, vinyl chloride, vinylidene chloride, etc. Acrylonitrile, acrylic acid, vinylidene cyanide, acrylamide, etc., provide low-molecular weight hydroxy-terminated diene intermediate copolymers which have sites suitable for cross-linking. As can be seen, the usable olefinic monomers may be ethylenes, substituted with halogen, aromatic hydrocarbon, or even cyano or carboxyl-containing radicals in some instances. The choice and amount of mono-olefinic monomer employed will often be determined on the basis of properties desired in the final elastomer resin. For example, solvent-resistant rubbers may be formulated by copolymerization of butadiene with acrylonitrile, or other mono-olefin, substituted with a non-hydrocarbon radical, to produce the intermediate polymer. Generally the amount of mono-olefinic monomer in the polymer will be about 0–75% by weight of the total addition polymer, preferably about 1 to 40% or even about 10–40%.

In addition to the homopolymers and copolymers comprised of single dienes and single mono-olefinic monomers, the present invention may also use polymers made from combinations of a plurality of dienes and mono-olefinic monomers. For example, mixtures of butadiene, isoprene and styrene can be polymerized to afford low molecular weight hydroxyl-containing interpolymers. Various combinations of dienes and mono-olefinic monomers may be copolymerized to produce hydroxyl-containing copolymers or interpolymers which may be used to form elastomers. Also, the polymer materials used in this invention may be given improved oxidation and ozone resistance by hydrogenating the hydroxyl-containing diene polymers to their corresponding more-saturated derivatives. Usually, the hydroxyl-containing diene polymers used in the present invention will at most be only partially hydrogenated, so as to provide a material which is more stable due to diminished unsaturation but which still has good elastomer properties.

The isocyanate material used to produce the urethane resin in the composition of this invention may be any one of a number of materials containing two or more isocyanate radicals. The usable agents for making the urethane polymers of this invention include aliphatic, including cycloaliphatic and aromatic diisocyanates such as 2,4-tolylene diisocyanate, metaphenylene diisocyanate, 2,6-tolylene diisocyanates (or mixtures of these materials), transvinylene diisocyanate, p,p'-diphenylmethane diisocyanate, 1,5-naphthylene diisocyanate, phenylene moieties. Typical reactions and reagents for such urethane polymer production are illustrated below:

amine-terminated products obtained from the reaction of dibasic acids with diamines; e.g., the reaction products

POLYOLEFIN-POLYETHER-URETHANE RUBBER

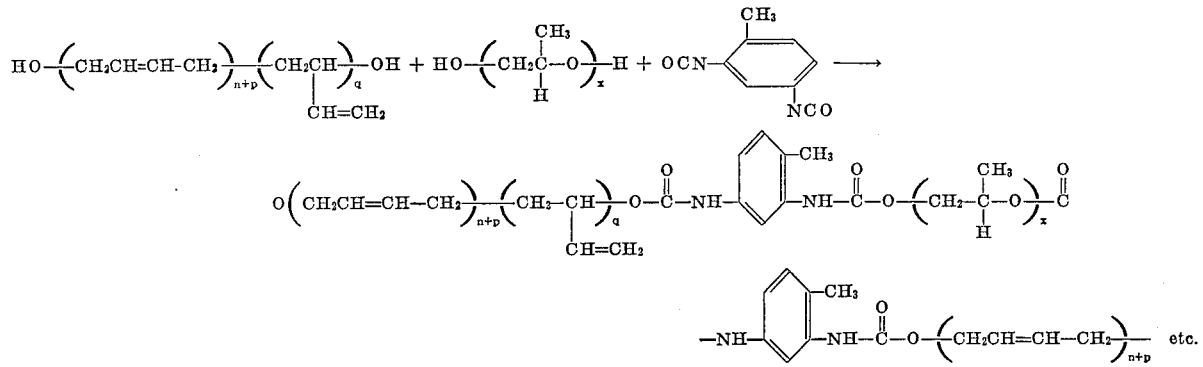

POLYOLEFIN-POLYESTER-URETHANE RUBBER

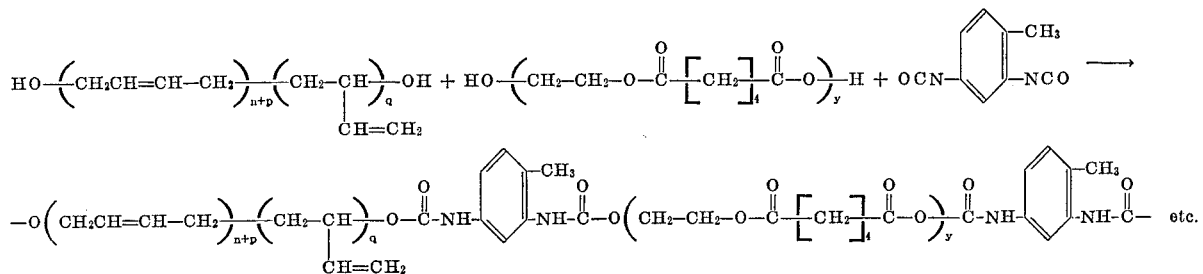

POLYOLEFIN-POLYESTER-POLYETHER-URETHANE RUBBER

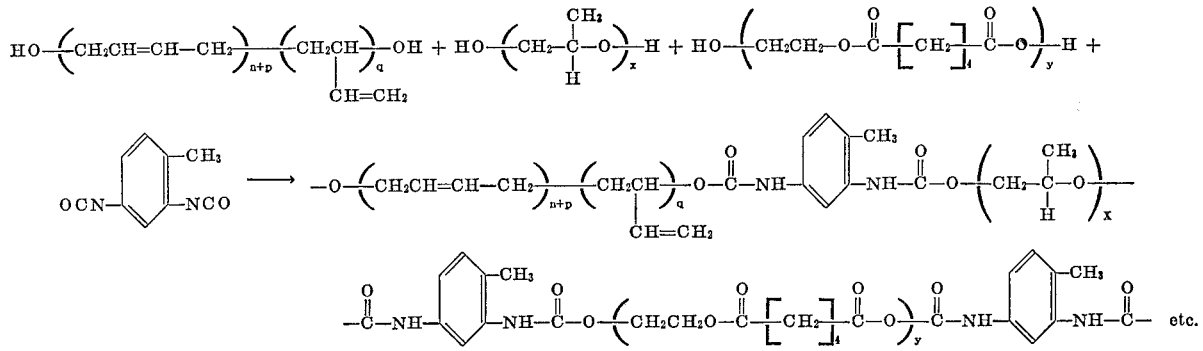

Urethane resin formation to give the compositions of this invention may also include diamine reactants to produce rubbers modified with urea-urethane resin. A wide variety of aromatic and aliphatic diamines may be employed as the reaction component to make such rubber compositions. These diamines may often be used in an amount sufficient to provide one amino group for each 0.1 to 9 hydroxyl groups, e.g., in the total of amino and hydroxyl groups, the amino group may represent about 10–90% of the total and hydroxyl groups may represent about 90–10% of the total. The amino material may be from less than about 10 to 90% of the total of amino and hydroxyl material, but, of course, enough of the diene intermediate polymer residue will be present to give the desired physical properties.

Typical amines of up to 40 or more carbon atoms which may be employed are aromatic diamines (both substituted and unsubstituted) such as 4,4′-methylene bis-(2-chloroaniline)(MOCA), 3,3′-dichlorobenzidine (DCB), N,N′-disecondarybutyl p-phenylene diamine, N,N′-dibenzyl-ethylene diamine, menthane diamine, ethylene diamine, ethanolamines, hydroxylamine, p,p′ diphenylamine, p-phenylene diamine, hexamethylene diamine, diethylene triamine, tetraethylene pentamine, lauroguanamine and of dimerized unsaturated fatty acids with diamines. Diamides of similar carbon atom range can also be employed as reagents in the polymerization; e.g., materials made by the reaction of dibasic acids, acid chlorides or anhydrides with ammonia. Other products which are useful are the reaction products of polyethers (e.g., poly[oxypropylene] glycol and polytetramethylene glycol) and ethylene imine; reaction products of hydroxyl-terminated polyesters with ethylene imine are also useful as amine reactants for preparing urea-urethane resins according to this invention. Amine-terminated polybutadiene homopolymers and copolymers which have been made by the reaction of the allylic hydroxyl-terminated polydiene homopolymers and copolymers with ethylene imine are also suitable as co-reactants in the production of rubber-urea-urethane compositions of the present invention.

The isocyanate is often employed in an amount sufficient to supply about 0.1 to 10 isocyanate functional groups per total active hydrogens of the diene intermediate polymer and any other active hydrogen-polyfunctional material used; the exact amount being subject to considerable variation within this range, depending, at least to some extent, on the manufacturing procedure to be followed. Preferably, about 0.5 to 3 isocyanate diisocyanates, octamethylene, diisocyanate, 3,3' - dimethoxy-4,4'-biphenyl diisocyanate and hexamethylene diisocyanate, as well as related aromatic and aliphatic isocyanates, which may also be substituted with other organic or inorganic groups that do not adversely affect the course of the reaction. These diisocyanates can be reacted with the diene intermediate polymers at ambient temperatures to form urethane linkages, apparently due to the increased reactivity given the hydroxyl groups by the allylic configuration. Such polymerization may require from a few minutes to 1 hour or to several days or weeks, depending upon, for instance, whether or not catalysts are employed in the reaction. Temperatures below ambient may also be employed. Elevated temperatures enhance cross-linking of the isocyanate-extended hydroxyl terminated diene polymers. Thus, after chain-extending at ambient temperatures the temperature may be raised to up to about 200° C., preferably 100–150° C.; or both chain-extension and cross-linking may be obtained simultaneously at these higher temperatures. Thus, isocyanate reactions are generally conducted at temperatures of about 50–200° C.

Polyisocyanates such as the materials sold commercially as PAPI (polyphenylmethane polyisocyanate) of the following structure:

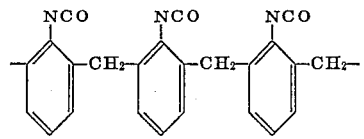

can also be employed. The particular isocyanate to be used may be selected in accordance with the properties desired in the final product. A higher molecular weight diisocyanate will tend to have its properties dominate in the finished elastomer while a low-molecular weight agent may have its properties subordinated to the elastic, etc., properties of the diene hydrocarbon polymer.

When a low molecular weight hydroxyl-containing polybutadiene is reacted with a diisocyanate, such as 2,4-tolylene diisocyanate, a polyolefin-polyurethane elastomer of the simplified following structure results:

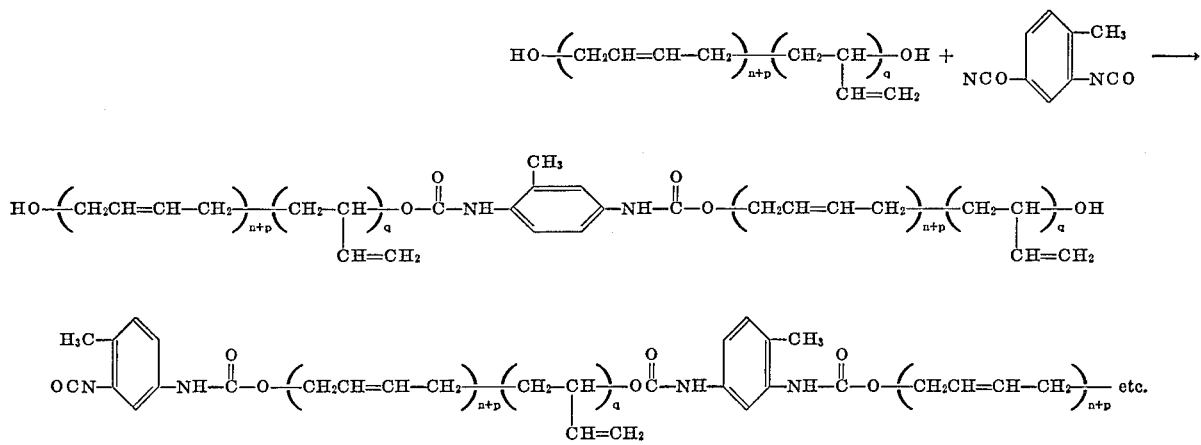

Rather than the simple or monomeric isocyanates described above, the hydroxy-containing, chain-extendable diene materials can be condensed with isocyanate-terminated polyethers or polyesters, etc., which are generally produced by reacting the isocyanate with, for example, polyglycols (such as polypropylene glycol) and polyesters (such as polyethylene adipate). These materials may be reacted with an excess of a diisocyanate. An example of such a material is the product obtained by the reaction of one mole of propylene glycol with 2 moles of 2,4-tolylene diisocyonate as shown below:

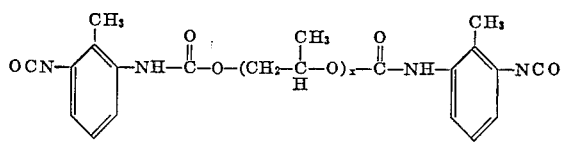

Isocyanate terminated polyether

It will be observed that the chain-extended polymer provides amino nitrogen having replaceable hydrogen which can be exploited in the cross-linking.

Rather than combine the polyisocyanate with only the alkyl-hydroxyl diene polymer, other polyfunctional reactants having at least two active hydrogens can be included with, before or subsequent to, combination of the polyisocyanate and alkyl-hydroxyl diene polymer. In other words the order of addition can be in any manner desired. Such other polyfunctional reactants may be up to about 90 or more weight percent based on the total of its weight and that of the alkyl-hydroxyl diene polymer and when such other polyfunctional material is present it often is at least about 5 weight percent. Thus, other hydroxyl-containing materials may be incorporated with the allyl-hydroxyl diene polymer fed to the reaction. For example, a hydroxyl-containing intermediate polybutadiene may be mixed with materials such as polypropylene glycol, polyethylene glycol, interpolymers of polyethylene and polypropylene oxides, and hydroxy-terminated polyesters which are normally employed to make conventional urethane rubber. In such cases polymers are formed which have polybutadiene moieties linked through chain-extension at the hydroxy residues to glycol, polyolefin, polyether or polyester groups are supplied for each diene polymer hydroxyl or other active hydrogen and the proportions often approach one mole of diisocyanate per mole of other polyfunctional material. Advantageously, about 4–10% tolylene diisocyanate can be employed in urethane formation, preferably about 5–8% based on the total weight of the polydiene employed, especially when no other active hydrogen material is present of markedly different molecular weight. Preferably, in a urea-urethane polymer, there will be about 1 to 1.5 isocyanate residues for each moiety reactant with the isocyanate, that is, the isocyanate residues will equal or surpass the total of hydroxyl and amino residues.

Resin formation may take place in a single step by blending in the individual ingredients, diisocyanate on the one hand, and diene intermediate polymer, with or without another polyfunctional, e.g., glycolic and/or diamino material, on the other hand.

Two-step procedures may also be employed in forming the novel compositions of this invention. In such procedures, an excess of the diisocyanate may be reacted with one or two of the other components, e.g., the diene intermediate polymer, the conventional glycol and/or the diamine, to produce a diisocyanate terminated prepolymer, which may subsequently be reacted with the remaining one or two of the above-mentioned other components to give the final urethane or urea-urethane resin. Preferably, the prepolymer is a diisocyanate terminated derivative of the polydiene intermediate polymer.

The procedure employed in combining the conventional or hydrocarbon type elastomer with the urethane resin is subject to a number of alternatives. For example, the hydroxyl-terminated polydiene resin may be milled or admixed with the general purpose or hydrocarbon type elastomer and the isocyanate reactant subsequently milled into the system. Or the isocyanate reactant may be initially milled or admixed with the general purpose elastomer, followed by the addition of the hydroxyl-terminated resin. Other polyfunctional reactants can be added with any component desired or can be separately added to the blends. These mixtures, regardless of the sequence of addition of the hydroxyl-terminated resin and other reactants, contains, at least upon initial mixing, the urethane component in an unreacted, uncured or partially cured state, i.e., is at least partially uncured, within the general purpose elastomer system. Thus, the urethane component must not be completely cured before admixture with the hydrocarbon-type rubber. This lack of cure when mixing must be sufficient to provide compatible materials and the presence of either unreacted isocyanate or unreacted hydroxyl groups is indicative of the uncured "urethane" state. Although it is preferred that the mixture of urethane and hydrocarbon type rubbers becomes eventually more or less completely cured, this may not be necessary in some instances, especially when the hydroxyl component is in sufficient excess. Thus, in Examples I–IV below, the isocyanate-to-hydroxyl ratio was sufficiently low that the mixture, which had been cured for a period of time, was still in a partially urethane cured state due to the presence of unreacted hydroxyl groups. The urethane material was millable with the ethylene-propylene rubber and there was no necessity for the use of a final urethane curing treatment.

The general purpose elastomer may be heated, e.g., in a Banbury mixer or rubber mill to about 100–250° F. prior to addition of the urethane or urethane-forming reactants. The preferred method for incorporating the urethane into the general purpose elastomer is to pre-mix the polydiene hydroxyl intermediate polymer with the diisocyanate reactant. While the mix is in a partially cured state (liquid, solid or semi-solid) it is blended into the general-purpose elastomer as on a rubber mill or Banbury-type mixer. The urethane reaction or cure may be completed in the general purpose elastomer, apparently to afford a solid solution of urethane rubber in the general purpose rubber. This mixture can then be compounded and cured using conventional sulfur or peroxide curing agents, if desired, which serves to interlink or co-cure the urethane and general purpose rubber.

Also, the hydroxyl-terminated resin may be mixed with the diisocyanate reactant and cured at ambient or elevated temperatures to a millable gum. This gum may then be milled into the general purpose elastomer. The millability of the urethane elastomers is dependent often upon the ratio of isocyanate to liquid diene resin employed for the formation of the urethane elastomer. For example, when the NCO/OH ratio (molar ratio) of isocyanate and polydiene reactant is low, e.g., about 0.6 or below, the elastomer produced therefrom is often tacky, even when cured over a substantial period of time and, therefore, is readily incorporated into the general purpose elastomer merely by milling at ambient temperatures or by mixing in a Banbury mixer with the general purpose elastomer. When the ratio of NCO/OH (molar ratio) in the reactant mixture is above about 0.6, such as near unity, e.g., 0.9 to about 1.2, the products are preferably cured to a lesser extent prior to milling with the general purpose elastomer. If complete curing of these systems is carried out, the blending operation is difficult, since the urethane elastomer system possesses a tight, wholly or partially cross-linked network which is difficult to mill or mix on a Banbury mill with the general purpose elastomer.

The cross-linking of proximate chains of the polymer may be brought about through the polydiene residues, the chain-extending agent residues, or both. The use of the preferred polydiene materials having at least 2.1 hydroxyls per molecule, allows cross-linking by means of urethane linkages when a suitable amount of diisocyanate is employed in the reaction. Also, the cross-linking may, and usually does, occur between the urethane moieties themselves of adjacent polymer molecules. After the urethane reaction, a post-cure using gamma rays, or a treatment similar to conventional vulcanization may be performed. Such a procedure generally employs the same conditions and reagents as employed with conventional rubber compositions. Sulfur, used as sulfur, thiuram derivatives and other materials commonly employed to vulcanize natural rubber, GRS rubber and related synthetic polyolefin rubbers, may thus be added to promote cross-linking. Generally, amounts of vulcanizing agents common to the art can be herein employed, for instance, about 1–50 parts, preferably about 1–10 parts by weight per part of polymer, as well as conventional vulcanization temperatures.

The isocyanate-terminated polymer described above also may be admixed with the general purpose elastomer using a rubber mill, Banbury mixer or other conventional mixing equipment. After the prepolymer is admixed with the general purpose elastomer, a diol (such as 2-ethylhexane diol) or other suitable polyol described above may be mixed into the mixture on a rubber mill or Banbury mixer. The final blend can then be cured at ambient temperature or elevated temperature to form a blend of high molecular weight linear or cross-linked elastomer within the general purpose elastomer network. The final blend may then be formulated with sulfur, zinc oxide, stearic acid and conventional rubber curing aids and accelerators to afford an elastomeric product showing improved tensile properties, abrasion resistance, resistance to swelling by organic solvents and oils. In place of, or along with, the diol, a diamine such as 3,3'-dichlorobenzidine, 4,4'-methylene-bis-2-chloroaniline, lauroguanamine, etc., may also be employed to chain extend or cross-link the prepolymer and provide a urea-urethane resin, with the mole ratio of isocyanate to amine plus polyol reactant being maintained near unity, e.g., the mole ratio of NCO/OH plus $NH_2$ is preferably maintained about 0.9 to 1.1.

Urea-urethane resin formation may take place in a single step by blending the individual ingredients, diisocyanate on the one hand, and diene intermediate polymer with or without diamino materials and/or glycolic materials on the other hand, in about stoichiometric proportions, with the natural or other conventional rubber to be improved according to this invention. The urea-urethane products are blended into the general purpose elastomers prior to effecting complete urethane-type cure of the urea-urethane products. The resulting blend can then be cured at elevated temperature and later formulated with conventional rubber curing aids as described. The final formulation can then be heat-cured at elevated temperature. Thus, the hydroxyl-terminated diene resin may be admixed with the diamine reactant and degassed in vacuo. The isocyanate reactant can then be added and the mixture becomes fluid or paste-like in consistency. The liquid or paste can then be admixed with the general purpose elastomer on a rubber mill or Banbury mixer. The finished blend is then cured at ambient or elevated temperature, usually followed by a conventional sulfur or peroxide cure.

Alternatively, after the hydroxyl-terminated diene resin is admixed with the diamine reactant and degassed in vacuo, the mixture may be blended with the general purpose elastomer on a rubber mill, Banbury mixer or other suitable equipment. The isocyanate reactant can then be added using the same mixing equipment. The resulting blend may be cured at ambient or elevated temperatures, followed by final sulfur or peroxide curing. In still another mode of operation, the hydroxyl-terminated diene resin may be admixed with the general purpose elastomer on a rubber mill, Banbury mixer or other mixer. The diamine reactant(s) and isocyanate reactant(s) are then added, either component being added first. The resulting blend is then post-cured at ambient or elevated temperature, followed by conventional sulfur or peroxide curing. Of course, many other alternate methods may be employed so long as the desired end-result is obtained.

Alternatively, the general purpose elastomers may be modified with the two-step or prepolymer urethane elastomers by first admixing the liquid prepolymer with the diol, polyol or amine reactant. This mixture is then blended into the general purpose elastomer using a rubber mill, Banbury mixer or other conventional mixing equipment. The blend is then post-cured at ambient or elevated temperature to form a linear or cross-linked polyurethane network within the general purpose elastomer. The final blend can then be formulated with sulfur, etc., as described above, and cured at elevated temperature to afford a final product showing improved tensile properties, abrasion resistance, resistance to swelling by organic solvents and oils. It should be pointed out that the modified general purpose elastomers prepared by blending with the prepolymer urethane elastomers of this invention show improved tack prior to carrying out the final sulfur cure; therefore, there is an improvement in the ease with which rubber goods may be fabricated.

Conventional urethane catalysts such as stannous octoate, diazobicyclooctane (DABCO), dibutyl tin dilaurate, lead naphthenate, cobalt naphthenate and the like may be employed to catalyze the formation of the urethane elastomer within the general purpose elastomer network. The catalyst concentrations may often vary from about 0.03 to about 1 part per hundred parts of hydroxyl-terminated diene polymer/urethane elastomer system which is added to the general purpose elastomer.

As mentioned previously, the hydrocarbon-type rubber with which the urethane of this invention is to be blended is selected from known single-and-multiple-component elastomers. Useable rubbers include natural rubber, styrene-butadiene and related type terpolymer rubbers, butyl and cis-polybutadiene rubber. This invention, as also mentioned, affords significant improvement to ethylene-propylene rubbers. Such rubbers are of important commercial potential because the monomers from which they are made are significantly less expensive than diolefin monomers. Copolymers of ethylene and propylene generally display elastomeric properties over a wide range of compositions, roughly 25–75% of each component, and have the properties of unvulcanized elastomers when the molecular weight is sufficiently high. These materials are generally soluble in hydrocarbon solvents at room temperature, have a relatively low modulus of elasticity, high resilience and considerable creep under prolonged stress. Such polymers may be prepared with a susceptibility for vulcanization or other cross-linking by including small amounts of alpha-olefins or other copolymerizable materials which retain a reactive group after the polymerization. Diolefins such as dicyclopentadiene, cyclooctadiene, 2-methyl, 1,4-pentadiene, etc., are often the preferred materials in such situations. The vulcanized E–P terpolymers show good resistance to aging and have greater tensile strength than natural rubber or GR–S polymers. Many E–P terpolymers contain about 35 to 80 mole percent ethylene, about 15 to 60 mole percent propylene and about 1 to 5 mole percent diene. Preferably, the amounts are about 50 to 67 mole percent ethylene and about 23 to 50 mole percent propylene, based on their total. Ethylene-propylene copolymers can be prepared by free-radical additional polymerization techniques. Such catalysts as the Ziegler type (usually mixtures of $TiCl_4$ or similar compounds with trialkyl aluminum compounds), supported transitional metal oxides, such as chromium oxide on a silica/alumina support or $MoO_3$ supported on alumina and activated by partial reduction with hydrogen may be employed. Generally such polymerization reactions are carried out under "low pressure" operating conditions.

The urethane rubber employed in this invention may be miscible in all proportions with conventional hydrocarbon-type rubbers. Thus, the composition of this invention may contain as little urethane rubber or as little conventional rubber as is needed to have a significant effect in the application desired, say, as little as 1% of each rubber. More usually, the finished composition of this invention may contain about 1–100% urethane resin, based on the weight of the hydrocarbon-type rubber. Often, about 4–50% urethane rubber, advantageously about 10–30% is employed.

Along with urethane resin and conventional hydrocarbon-type rubbers, the novel compositions of this invention may contain bulk extenders such as extender mineral oils (including asphalt and similar heavy hydrocarbons), strengtheners, such as carbon black, and pigments, fillers, etc., as commonly used with general purpose rubbers. Ordinarily these ingredients may form a considerable proportion of the final product, being as little, for example, as 1% or less of the total rubber ingredients up to ten times or more of such ingredients. Extender oil and carbon black components equalling the weight of the general purpose and urethane rubber combined is not unusual. The extender oils, carbon black, etc., may be incorporated into the general purpose hydrocarbon-type rubber before the urethane resin or its ingredients are added to the mixer or mill; alternatively, after incorporation of the urethane elastomer into the general purpose elastomer, the resulting product is further blended with sulfur, zinc oxide, stearic acid, inert or reinforcing filler, extender oils and resins, etc., and the final mixture cured at elevated temperatures of say about 200–400° F., preferably about 275–325° F. Peroxide cures may also be effected at about the same temperature ranges.

The following examples of compositions according to this invention illustrate this invention, but should not be considered limiting.

EXAMPLE I

Polybutadiene No. 45 is a polybutadiene homopolymer having a viscosity of 50 poises at 30° C., a hydroxyl content of 0.95 meq./gm., a hydroxyl number (mg.

KOH/gm.) of 53, and average molecular weight of 2200–2500, about 2.1–2.2 terminal, allylic, hydroxyl groups which are predominantly primary per polymer molecule, and an iodine number of 398. It can be prepared by polymerizing 100 parts of butadiene in the presence of 70 parts of isopropanol and 10 parts of hydrogen peroxide in an aluminum clad autoclave at 118° C., for 2 hours.

94.5 parts of this homopolymer was reacted with 5.5 parts of tolylene diisocyanate (a commercial mixture of 80% 2,4-TDI and 20% 2,6-TDI) and the mixture allowed to cure for one week at room temperature. 25 grams of this urethane was placed on a roller mill at 120° C., along with a like quantity of a commercially obtained ethylene-propylene terpolymer rubber obtained from the Naugatuck Chemical Co. The materials were comilled for several minutes. At the end of this time the mixture appeared to be homogeneous. To the mix on the roller mill was added one gram of sulfur, 2.5 grams of zinc oxide, 1 gram of stearic acid and 1 gram of tetramethyl thiuram disulfide. Milling was continued for about 15 minutes and the rolled sheet was cured in a molding press at about 150° C. at several hundred pounds pressure. As far as could be determined, covulcanization had taken place to give elastomeric materials containing urethane as well as ethylene-propylene rubber characteristics.

EXAMPLE II

Runs were conducted similar to Example I except that the urethane elastomer was comilled with natural rubber and with Hycar, a commercially obtained nitrile rubber comprising a copolymer of acrylonitrile and butadiene. These blends were translucent after milling and oil extension.

EXAMPLE III

A urethane elastomer was prepared by reacting 30 grams of polypropylene glycol (1010 molecular weight), 14 grams of hydroxyl-terminated polybutadiene homopolymer of Example I and 6.3 grams of tolylene diisocyanate. The mixture was cured at 65° C., for 64 hours to afford a light-colored gumstock which was admixed with natural rubber on a rubber mill, in equal weights, to afford a compatible gumstock, which was oil extendible, sulfur curable, and readily reinforced by carbon black.

EXAMPLE IV

The run of Example III was repeated using a urethane system prepared from 90 parts of the polybutadiene homopolymer and 10 parts of a polypropylene glycol (2025 molecular weight) and 7.2 parts of tolylene diisocyanate. The mixture was cured at 65° C. for 64 hours. The resulting urethane gumstock was milled with natural rubber in equal quantities to produce a soft gumstock which was sulfur curable, oil extendible and readily reinforced with carbon black.

EXAMPLES V TO VII

A polybutadiene homopolymer was prepared by polymerization of 100 parts of butadiene with 70 parts of isopropanol and 12 parts of hydrogen peroxide (50%) at 118° C., for 2.5 hours. The homopolymer had the following properties:

| OH Content | 0.88 meq./g. | I. R. Analysis |
|---|---|---|
| Mol. Wt. Osmometric | 2,350 | Trans 59.2. Vinyl 19.8. Cis 21.0. |
| Mol. Wt. End Group Analysis | 2,270 | |

It was estimated that the polymer contained an average of about 2.1 hydroxyl groups per molecule.

200 grams of this polydiene polymer were mixed with 15.2 grams of tolylene diisocyanate (NCO/OH=1.0). During the hour after the mixture, a 5 gram portion, a 25 gram portion and a 10 gram portion of this mixture were added to samples of natural rubber amounting to 95, 75 and 90 grams respectively. Each rubber sample was being milled on a 2 inch rubber mill heated to 240° F. (20 p.s.i. steam pressure). Each polymer mixture sample was added over a five minute period and allowed to comill for an additional 15–20 minutes. The urethane-rubber mixtures were removed from the mill and cured in aluminum molds at 100° C., for 4 hours. The samples were allowed to further cure at room temperature for two weeks before taking test specimens.

The remainder of the gumstocks, after test specimens were taken, were remilled on the rubber mill. It was found that after curing the urethane in the natural rubber matrix the raw gumstocks had better processability characteristics. The urethane modified rubber was easier to mill and had considerably more tack than unmodified natural rubber. Using a conventional rubber recipe, vulcanization ingredients were added to the urethane-modified rubbers on the rubber mill, and subsequently, cured at 300° F. The vulcanized urethane modified natural rubbers showed increased abrasion resistance, increased solvent resistance and, in general, better physical properties than natural rubber vulcanizate.

EXAMPLE VIII

A polybutadiene copolymer was prepared as above but with 15% acrylonitrile substituted for a like amount of butadiene. The resulting liquid intermediate polymer had a hydroxyl equivalent of 0.71 meq./g., and was estimated to contain 2.5 average hydroxyl groups per molecule. To 100 grams of this polymer 2 grams of 3,3'-dichlorobenzidine, 3 grams of Ethyl 702 antioxidant and 1.0 gram of dibutyl tin dilaurate were added, mixed at 140° C., and degassed for 1 hour.

To 95 grams of a commercially obtained styrene-butadiene rubber on a two-inch rubber mill at 240° F., was added 5 g. of the above mix to which 0.6 g. of tolylene diisocyanate had just been added. The addition of the urea-urethane mix took 20 minutes and comilling was allowed for an additional 10 minutes. The gumstock was removed from the mill and the urea-urethane modified rubber was allowed to cure 4 hours at 100° C., and two weeks at room temperature. After obtaining test specimens, the remaining urea-urethane modified rubber was remilled and conventional vulcanization ingredients added on the rubber mill. The urea-urethane modified rubber was then vulcanized at 300° F., for thirty minutes and a urea-urethane natural rubber covulcanizate was obtained.

EXAMPLE IX

A prepolymer containing 9% free NCO was prepared by reacting the hydroxyl-terminated polybutadiene intermediate polymer of Example V, with excess tolylene diisocyanate at 60–80° C., for two hours. To 90 g. of commercially obtained styrene-butadiene rubber on a 2″ rubber mill at 240° F., was added 8 g. of the prepolymer and 2.5 g. of 1,3-ethylhexane diol which had been mixed just prior to addition to the rubber. The milling time was 20 minutes and the mixture was allowed to comill for an additional 10 minutes. The urethane modified rubber was cured at 100° C., for 4 hours and two weeks at ambient temperature. After obtaining test specimens the urethane modified rubber was covulcanized using a conventional rubber recipe.

EXAMPLE X

In the same manner as above Tenamene-4(N,N'-bis-[1,4-dimethylpentyl]-p-phenylene diamine) was used in place of 1,3-ethylhexandiol as achain extender to yield a urea-urethane modified covulcanized rubber.

EXAMPLES XI–XLIII

Using the above procedure the urethane and urea-urethane modified rubbers described in Table I, below, were prepared. In this table Type A urethane is an intermediate hydroxyl-terminated polybutadiene mixed with tolylene diisocyanate as in Examples I–III; Type B is a liquid hydroxyl-terminated butadiene-acrylonitrile copolymer, as in Example IV, mixed with 6.2 grams, per 100 grams of intermediate polymer, of tolylene diisocyanate. Type C urethane is a styrene-butadiene copolymer liquid containing about 25% styrene and having a hydroxyl equivalent of 0.75 meq./g. and about 2.1 average hydroxyl groups per molecule, estimated. It was made by the method of Example I and mixed with 6.5 grams tolylene diisocyanate for each 100 grams intermediate polymer. Types D, E and F are urea-urethanes prepared from 200 grams of hydroxyl-terminated diene polymer, 22.3 grams of Curithane C–126 diamine, 2 grams Ethyl 702 anti-oxidant and 0.67 gram dibutyl tin dilaurate catalyst. In Type D, the polybutadiene prepolymer of Type A is employed; in Type E, the liquid polybutadiene-styrene copolymer of Type C was employed; in Type F, the prepolymer is the acrylonitrile copolymer of Example IV. Each of types D, E and F comprised a mixture of 0.7 gram tolylene diisocyanate to each 5 grams of urea-urethane.

5. The composition of claim 4 in which the diene is butadiene.

6. The composition of claim 1 in which the hydrocarbon rubber is ethylene-propylene terpolymer rubber containing about 25 to 75% propylene.

7. A composition consisting essentially of hydrocarbon rubber and about 1–100% by weight of the rubber, of urea-urethane resin made by reaction of a diisocyanate, a diamine and an intermediate polyhydroxy polymer having an average of at least 2.1 predominantly primary, terminal, allylic hydroxyl groups per molecule and being an addition polymer of 0–75% by weight of an alpha-olefin monomer of 2 to 12 carbon atoms, and about 25–100% of a 1,3-diene hydrocarbon of 4 to about 12 carbon atoms, said intermediate polymer having a viscosity at 30° C., of about 5–20,000 poises and a number average molecular weight of about 400–25,000, said urethane being at least partially uncured when combined with said hydrocarbon rubber.

8. The composition of claim 7 in which the diene is butadiene.

9. The composition of claim 7 in which the urea-

TABLE I

| Example: | Rubber (parts) | Urethane Polymer Type (parts) | TDI (pts.) | Rubber Milling Time (min.) | Comilling Time (min.) |
|---|---|---|---|---|---|
| XI | Natural, 95 | D–5 | 0.7 | 5 | 15 |
| XII | Natural, 75 | D–22 | 3.2 | 30 | 15 |
| XIII | Natural, 90 | D–9 | 1.3 | 10 | 15 |
| XIV | Styrene-butadiene, 75 | D–22 | 3.2 | 30 | 15 |
| XV | Styrene-butadiene, 50 | D–44 | 6.4 | 60 | 15 |
| XVI | Styrene-butadiene, 95 | D–5 | 0.7 | 5 | 15 |
| XVII | Styrene-butadiene, 90 | D–9 | 1.3 | 15 | 15 |
| XVIII | Styrene-butadiene, 95 | A–5 | | 10 | 10 |
| XIX | Styrene-butadiene, 90 | A–10 | | 20 | 10 |
| XX | Styrene-butadiene, 75 | A–25 | | 40 | 10 |
| XXI | Natural, 95 | B–5 | | 10 | 10 |
| XXII | Natural, 90 | B–10 | | 15 | 10 |
| XXIII | Natural, 75 | B–25 | | 30 | 10 |
| XXIV | Natural, 40 | B–24 | | 30 | 10 |
| XXV | Styrene-butadiene, 95 | B–5 | | 30 | 10 |
| XXVI | Hycar, 95 | B–5 | | 30 | 10 |
| XXVII | Natural, 95 | C–5 | | 10 | 10 |
| XXVIII | Natural, 90 | C–10 | | 15 | 10 |
| XXIX | Natural, 75 | C–25 | | 30 | 10 |
| XXX | Natural, 50 | C–25 | | 30 | 10 |
| XXXI | Natural, 95 | F–5 | 0.6 | 10 | 10 |
| XXXII | Natural, 90 | F–9 | 1.1 | 20 | 10 |
| XXXIII | Natural, 75 | F–23.5 | 2.6 | 25 | 5 |
| XXXIV | Styrene-butadiene, 95 | F–5 | 0.6 | 20 | 10 |
| XXXV | Styrene-butadiene, 90 | F–9 | 1.1 | 25 | 7 |
| XXXVI | Styrene-butadiene, 75 | F–22.5 | 2.5 | 70 | 15 |
| XXXVII | Ethylene-propylene, 95 | F–5 | 0.6 | 15 | 10 |
| XXXVIII | Natural, 95 | E–4.5 | 0.5 | 8 | 12 |
| XXXIX | Natural, 90 | E–9.0 | 1.1 | 10 | 10 |
| XL | Natural, 75 | E–22.4 | 2.6 | 16 | 9 |
| XLI | Styrene-butadiene, 95 | E–4.5 | 0.5 | 8 | 12 |
| XLII | Styrene-butadiene, 95 | E–9.0 | 1.1 | 9 | 11 |
| XLIII | Styrene-butadiene, 75 | E–22.4 | 2.6 | 18 | 7 |

It is claimed:

1. A composition consisting essentially of hydrocarbon rubber and urethane made by reaction of a diisocyanate with an intermediate polyhydroxy polymer having an average of at least about 1.8 predominantly primary, terminal, allylic hydroxyl groups per average molecule and being an addition polymer of 0–75% by weight of an alpha-olefin monomer of 2 to 12 carbon atoms, and about 25 to 100% of a 1,3-diene hydrocarbon of 4 to about 12 carbon atoms, said intermediate polymer having a viscosity at 30° C., of about 5–20,000 poises and a number average molecular weight of about 400–25,000, said urethane being at least partially uncured when combined with said hydrocarbon rubber.

2. The composition of claim 1 in which the intermediate polyhydroxy polymer has an average of about 2.1 to 2.8 predominantly primary, terminal, allylic hydroxyl groups per average molecule.

3. The composition of claim 2 in which the diene is butadiene.

4. The composition of claim 2 in which the urethane resin comprises about 10 to 30% by weight of the composition.

urethane resin comprises about 10–30% by weight of the composition.

10. A method for making a blend of urethane resin and hydrocarbon rubber which consists essentially of partially reacting a diisocyanate with an intermediate polyhydroxy polymer having an average of at least about 1.8 predominantly primary, terminal, allylic hydroxyl groups per average polymer molecule and being an addition polymer of 0–75% by weight of an alpha-olefin monomer of 2 to 12 carbon atoms, and about 25–100% of a 1,3-diene hydrocarbon of 4 to about 12 carbon atoms, said intermediate polymer having a viscosity at 30° C., of about 5–20,000 poises and a number average molecular weight of about 400–25,000, blending said partially reacted product with hydrocarbon rubber and vulcanizing the blended product.

11. The composition of claim 1 in which the intermediate polyhydroxy polymer has the majority of its unsaturation in the main carbon chain, and said urethane is present in amount of about 4 to 50% by weight.

12. The composition of claim 1 in which the intermediate polyhydroxy polymer has a cis-1,4-unsaturation content of about 10–30 percent, a trans-1,4-unsaturation content of about 40–70 percent and a pendant 1,2-vinyl unsaturation of about 10–35 percent.

13. The composition of claim 12 in which the hydrocarbon rubber is ethylene-propylene terpolymer rubber containing about 25 to 75% propylene.

14. The composition of claim 12 in which the intermediate polyhydroxy polymer is obtained by addition polymerization of said alpha-olefin monomer and said 1,3-diene hydrocarbon in solution in a saturated alcohol of 2 to 12 carbon atoms containing hydrogen peroxide dissolved therein.

15. The composition of claim 12 in which the intermediate polyhydroxy polymer is obtained by addition polymerization of butadiene in solution in an alcohol containing hydrogen peroxide dissolved therein, said alcohol being selected from the group consisting of propanol and isopropanol.

16. The composition of claim 7 in which the intermediate polyhydroxy polymer has the majority of its unsaturation in the main carbon chain.

17. The composition of claim 7 in which the intermediate polyhydroxy polymer has a cis-1,4-unsaturation content of about 10–30 percent, a trans-1,4-unsaturation content of about 40–70 percent and a pendant 1,2-vinyl unsaturation of about 10–35 percent.

18. The composition of claim 7 in which the intermediate polyhydroxy polymer is obtained by addition polymerization of said alpha-olefin monomer and said 1,3-diene hydrocarbon in solution in a saturated alcohol of 2 to 12 carbon atoms containing hydrogen peroxide dissolved therein.

19. The composition of claim 7 in which the intermediate polyhydroxy polymer is obtained by addition polymerization of butadiene in solution in an alcohol containing hydrogen peroxide dissolved therein, said alcohol being selected from the group consisting of propanol and isopropanol.

20. The method of claim 10 in which the intermediate polyhydroxy polymer has the majority of its unsaturation in the main carbon chain.

21. The method of claim 10 in which the intermediate polyhydroxy polymer has a cis-1,4-unsaturation content of about 10–30 percent, a trans-1,4-unsaturation content of about 40–70 percent and a pendant 1,2-vinyl unsaturation of about 10–35 percent.

22. The method of claim 10 in which the intermediate polyhydroxy polymer is obtained by addition polymerization of said alpha-olefin monomer and said 1,3-diene hydrocarbon in solution in a saturated alcohol of 2 to 12 carbon atoms containing hydrogen peroxide dissolved therein.

23. The method of claim 10 in which the intermediate polyhydroxy polymer is obtained by addition polymerization of butadiene in solution in an alcohol containing hydrogen peroxide dissolved therein, said alcohol being selected from the group consisting of propanol and isopropanol.

References Cited

UNITED STATES PATENTS

| | | | |
|---|---|---|---|
| 3,175,997 | 3/1965 | Hsieh | 260—859 |
| 3,338,861 | 8/1967 | Mastin | 260—859 |

SAMUEL H. BLECH, *Primary Examiner.*

P. LIEBERMAN, *Assistant Examiner.*

U.S. Cl. X.R.

260—77.5, 94.7, 5, 83.3, 85.1, 83.5, 41.5, 23.7